US010658119B1

(12) United States Patent
Bandalo

(10) Patent No.: US 10,658,119 B1
(45) Date of Patent: May 19, 2020

(54) MULTIELECTRODE POWER CAPACITOR WITH REDUCE NOISE VIBRATION

(71) Applicant: ABB Schweiz AG, Baden (CH)

(72) Inventor: Felix Bandalo, Ludvika (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/606,511

(22) PCT Filed: Apr. 25, 2018

(86) PCT No.: PCT/EP2018/060512
§ 371 (c)(1),
(2) Date: Oct. 18, 2019

(87) PCT Pub. No.: WO2018/197522
PCT Pub. Date: Nov. 1, 2018

(30) Foreign Application Priority Data

Apr. 26, 2017 (EP) .................................. 17168209

(51) Int. Cl.
*H01G 4/38* (2006.01)
*H01G 4/32* (2006.01)
(Continued)

(52) U.S. Cl.
CPC .............. *H01G 4/38* (2013.01); *H01G 4/008* (2013.01); *H01G 4/224* (2013.01); *H01G 4/32* (2013.01); *H01G 4/232* (2013.01)

(58) Field of Classification Search
CPC .................................. H01G 4/32; H01G 4/38
See application file for complete search history.

(56) References Cited

U.S. PATENT DOCUMENTS

| 3,593,072 A | 7/1971 | Bailey |
| 3,715,784 A | 2/1973 | Rayburn |

(Continued)

FOREIGN PATENT DOCUMENTS

| CN | 102522198 A | 6/2012 |
| DE | 2015372 A1 | 2/1972 |

(Continued)

OTHER PUBLICATIONS

International Search Report & Written Opinion of the International Searching Authority Application No. PCT/EP2018/060512 Completed: Jun. 21, 2018; dated Jul. 3, 2018, 12 Pages.

(Continued)

*Primary Examiner* — Eric W Thomas
(74) *Attorney, Agent, or Firm* — Whitmyer IP Group LLC

(57) ABSTRACT

A power capacitor including: a casing, a first bushing, a second bushing or an earthing stud having the same electric potential as the casing, wherein the first and second bushing extend through the casing, a dielectric liquid, and a plurality of wound capacitor elements, each wound capacitor element including: a first electrode having two first layers of electrically conducting material connected to the first bushing, the two first layers being arranged movable towards and from each other, a second electrode having two second layers of electrically conducting material connected to the second bushing or to the earthing stud, the two second layers being arranged movable towards and from each other, and a dielectric layer arranged between the first electrode and the second electrode, wherein the two first layers, the two second layers and the dielectric layer are together wound in a plurality of turns to obtain a plurality of layers of the first electrode, of the second electrode and of the dielectric layer, wherein the wound capacitor elements are arranged in a stacked manner in the casing, adjacent wound capacitor (Continued)

elements being in direct contact with each other, and wherein the capacitor elements are submerged in the dielectric liquid.

17 Claims, 3 Drawing Sheets

(51) Int. Cl.
  *H01G 4/008* (2006.01)
  *H01G 4/224* (2006.01)
  *H01G 4/232* (2006.01)

(56) References Cited

U.S. PATENT DOCUMENTS

| | | | | |
|---|---|---|---|---|
| 4,228,481 A | * | 10/1980 | DiNicola | H01G 4/22 |
| | | | | 361/303 |
| 4,348,712 A | * | 9/1982 | Newcomb | H01G 13/02 |
| | | | | 361/303 |
| 4,422,962 A | | 12/1983 | Cichanowski | |
| 4,464,700 A | * | 8/1984 | Stenerhag | H01G 4/005 |
| | | | | 361/307 |
| 5,563,763 A | * | 10/1996 | Johansson | H01G 4/224 |
| | | | | 257/306 |
| 2005/0019652 A1 | | 1/2005 | Fauteux | |
| 2010/0203393 A1 | | 8/2010 | Depond | |
| 2012/0229948 A1 | * | 9/2012 | Sawyer | H01G 4/32 |
| | | | | 361/301.1 |
| 2017/0025223 A1 | | 1/2017 | Bultitude et al. | |

FOREIGN PATENT DOCUMENTS

| | | |
|---|---|---|
| DE | 3148360 A1 | 6/1983 |
| DE | 102004038863 B3 | 4/2006 |
| EP | 0701263 B1 | 3/1996 |
| EP | 1724796 A2 | 11/2006 |
| EP | 1801824 A1 | 6/2007 |
| EP | 2443639 B1 | 9/2017 |
| JP | 2012009654 A | 12/2012 |
| JP | 2013239624 A | 11/2013 |
| WO | 2014080411 A1 | 5/2014 |
| WO | 2014202446 A1 | 12/2014 |

OTHER PUBLICATIONS

Written Opinion Application No. 17168209.9 Completed: Dec. 22, 2017, 5 Pages.

* cited by examiner

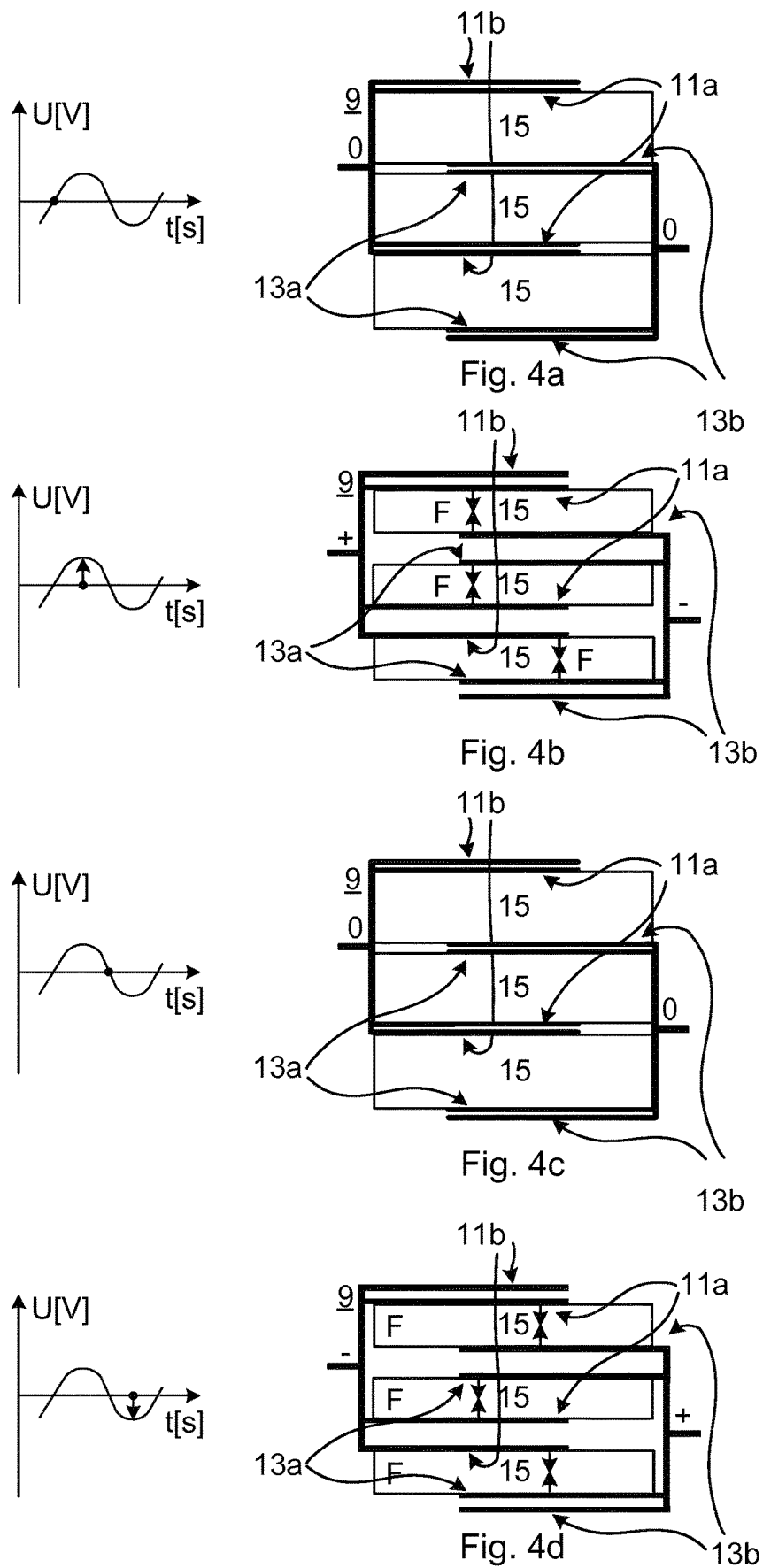

US 10,658,119 B1

MULTIELECTRODE POWER CAPACITOR WITH REDUCE NOISE VIBRATION

TECHNICAL FIELD

The present disclosure generally relates to power capacitors. In particular it relates to a power capacitor that provides vibration attenuation.

BACKGROUND

A power capacitor may comprise a plurality of capacitor elements which are electrically connected in parallel and in series. As depicted in FIG. 1a, each such capacitor element comprises two electrode layers 19 and 21 and an intermediate dielectric layer 23. The dielectric layer 23 is thus arranged between the two electrode layers 19 and 21. The dielectric layer 23 may for example comprise a polymer material. The capacitor elements are wound so that a great plurality of turns of the two electrode layers and the dielectric layer are obtained. The capacitor elements can be arranged in a stacked manner forming an active package inside an enclosure or casing of the power capacitor. Inside the enclosure, the active package is immersed in a liquid capable to penetrate the polymer materials.

In FIG. 1a, the capacitor element is shown during a zero-crossing, i.e. when the voltage applied across the two electrodes 19 and 21 is zero. When a voltage is applied to the two electrodes 19 and 21 of the power capacitor, as shown in FIG. 1b, an attractive force, Coulomb force, is generated across the dielectric layer 23 between the two electrodes 19 and 21 because the two electrodes have different electric potential. This attractive force indicated by arrow 17, and also by the arrows between the electrode layers, is simultaneously acting on each turn of the power capacitor. This force will deform the soft dielectric material between the electrodes. The total deformation of the active package is the sum of the deformation across all of the turns of all the capacitor elements. When the voltage crosses the next zero-crossing, the attractive force will become zero as shown in FIG. 1c. When the voltage potential is reversed, charges on the electrodes 19 and 21 will change polarity but the same attractive force will appear once again, as shown in FIG. 1d. This gives rise to a mechanical movement between the electrode layers causing them to oscillate at a frequency twice the frequency of the applied alternating voltage. Since the stack of capacitor elements is immersed in liquid, the vibrations of the capacitor elements are transferred to the capacitor enclosure. The surface vibrations of the enclosure will generate undesirable sound in the form of audible noise.

An example of a power capacitor with noise reduction capabilities is disclosed in EP 0 701 263 B1. The power capacitor comprises at least two capacitor elements which are composed of electrodes separated by one or more dielectrics. The capacitor elements are arranged in a row to form a capacitor package. At least one spring element is arranged between a pair of adjacent capacitor elements in the row or fixed at the outside of the capacitor element at one end of the row. The stiffness of the spring element is adapted such that the external vibrations of the capacitor are reduced. This results in a reduced sound radiation from the capacitor.

WO2014202446 discloses a capacitor device which has a plurality of capacitor elements arranged in rows or stacked. Each capacitor element has two electrodes and a dielectric material arranged between the electrodes. There is between each pair of adjacent capacitor elements a damping element for attenuating vibrations caused by the electrodes.

The spring element and the damping elements in the prior art occupy space inside the enclosure of the power capacitor while not contributing to the capacitance of the power capacitor.

SUMMARY

In view of the above, an object of the present disclosure is to provide a power capacitor which solves, or at least mitigates, the problems of the prior art.

There is hence provided a power capacitor comprising: a casing, a first bushing, a second bushing or an earthing stud having the same electric potential as the casing, wherein the first bushing and the second bushing extend through the casing, a dielectric liquid, and a plurality of wound capacitor elements, each wound capacitor element comprising: a first electrode comprising two first layers of electrically conducting material connected to the first bushing, the two first layers being arranged movable towards and from each other, a second electrode comprising two second layers of electrically conducting material connected to the second bushing or to the earthing stud, the two second layers being arranged movable towards and from each other, and a dielectric layer arranged between the first electrode and the second electrode, wherein the two first layers, the two second layers and the dielectric layer are together wound in a plurality of turns to obtain a plurality of layers of the first electrode, of the second electrode and of the dielectric layer, wherein the wound capacitor elements are arranged in a stacked manner in the casing, adjacent wound capacitor elements being in direct contact with each other, and wherein the capacitor elements are submerged in the dielectric liquid.

Attenuation of the oscillations of the first electrode and the second electrode may thereby be obtained. This may in particular be obtained by the electrode configuration where each of the first electrode and the second electrode comprises two distinct layers of electrically conducting material extending parallel with each other turn by turn. The first electrode and the second electrode will still be attracted through the dielectric, but the repulsion of the two layers of each electrode, due to being on the same voltage potential, counteracts the electrode movement as the voltage alternates. The vibrations will therefore essentially cancel and attenuation of sound can thereby be obtained.

The sound attenuation is hence obtained solely due to the dual-layered configuration of the first electrode and the dual-layered configuration of the second electrode.

According to one embodiment the two first layers have the same layer thickness.

By providing the two first layers of electrically conducting material with the same thickness better vibration cancellation may be obtained.

According to one embodiment the two second layers have the same layer thickness.

By providing the two second layers of electrically conducting material with the same thickness better vibration cancellation may be obtained.

According to one embodiment each of the two first layers is a conducting foil.

The two first layers of conducting foil are arranged in a layered manner and wound together with the two second layers and the dielectric layer.

Each conducting foil may for example be made of aluminum.

Each conducting foil may according to one example comprise a zinc alloy.

The conducting foils may beneficially be made very thin, so that their total thickness corresponds to the thickness of a standard electrode foil of a power capacitor.

According to one embodiment each of the two first layers is a metallization layer provided on a respective side of a film. To this end, the first electrode may comprise a double-metallized film. Each metallized layer of the double-metallized film defines a respective one of the two first layers of electrically conducting material of the first electrode. The film may for example be a suitably soft polymer film.

The metallization to obtain the two first layers of electrically conducting material may for example be obtained by electroplating, spraying or physical vapor deposition (PVD).

According to one embodiment each of the two second layers is a conducting foil.

The two second layers of conducting foil are arranged in a layered manner and wound together with the two first layers and the dielectric layer.

Each conducting foil may for example be made of aluminum.

Each conducting foil may according to one example comprise a zinc alloy.

The conducting foils may beneficially be made very thin, so that their total thickness corresponds to the thickness of a standard electrode foil of a power capacitor.

According to one embodiment each of the two second layers is a metallization layer provided on a respective side of a film. To this end, the second electrode may comprise a double-metallized film. Each metallized layer of the double-metallized film defines a respective one of the two second layers of electrically conducting material of the second electrode. The film may for example be a suitably polymer film.

The metallization to obtain the two second layers of electrically conducting material may for example be obtained by electroplating, spraying or PVD.

According to one embodiment the first electrode comprises exactly two first layers of electrically conducting material. The first electrode may hence consist of two first layers of electrically conducting material.

According to one embodiment the second electrode comprises exactly two second layers of electrically conducting material. The second electrode may hence consist of two second layers of electrically conducting material.

It is beneficial to use only two first layers of electrically conducting material because in this manner the cancellation effect of the vibrations may be obtained while the material cost and the size of the wound capacitor element may be kept low. Additional layers of electrically conducting material does not contribute to the capacitance of the power capacitor, and therefore exactly two first layers and exactly two second layers is considered to be optimal to achieve maximal sound attenuation with minimal loss of capacitance per volume of the power capacitor.

According to one embodiment the capacitor elements are flattened.

By flattened capacitor element is meant that the wound capacitor element has been compressed. An initially cylindrical roll of a capacitor element has been radially compressed to an oval or oblong shape. The cross-section of the capacitor element hence has an oval shape or an oblong shape. In cross-section the capacitor element will have one minor axis and one major axis.

By the flattened structure the capacitor elements take up less space in the casing and the energy density of the power capacitor is increased.

The problem with vibrations of capacitor elements arise may be especially problematic in flattened capacitor elements because they are not rotationally symmetric like cylindrical capacitor elements.

According to one embodiment for each capacitor element each of the two first layers consists of a respective single first continuous layer and each of the two second layers consists of a respective single second continuous layer.

According to one embodiment each of the first two layers and each of the second two layers extend along a majority of the axial length of the capacitor element.

According to one embodiment each of the first two layers extends from a first axial end of the capacitor element towards an opposite second axial end of the capacitor element terminating before reaching the second axial end, and wherein each of the second two layers extends from the second axial end towards the first axial end terminating before reaching the first axial end.

According to one embodiment the dielectric layer is arranged between the first electrode and the second electrode, whereby the first electrode, the dielectric layer and the second electrode are arranged parallel to each other in a sandwiched configuration.

According to one embodiment when the first electrode has a positive or negative electric potential for each capacitor element a first layer of the first electrode is attracted to one layer of the second layers arranged on the opposite side of the dielectric layer, and another layer of the second layers of the second electrode, adjacently arranged to the one layer, and the one layer repel each other.

According to one embodiment when the first electrode has a positive or negative electric potential for each capacitor element the two first layers repel each other.

In any direction perpendicular to the central axis of a capacitor element, at any axial point where the first electrode and the second electrode overlap turn for turn, the two first layers will repel each other and the two second layers will repel each other when one of the two electrodes has a positive electric potential and the other electrode has a negative electric potential. Additionally, the first electrode and the second electrode will attract each other. Hence, in said any perpendicular direction, there will be an alternating attraction-repulsion configuration between pairs of adjacent first/second layers of the electrodes.

According to one example, each capacitor element may comprise a single dielectric sheet or film forming the dielectric layer between the first electrode and the second electrode.

According to one example the first electrode is directly connected to the first bushing. The first electrode is hence in mechanical contact with the first bushing.

According to one example the second electrode is directly connected to the second bushing or the earthing stud. The second electrode is hence in mechanical contact with the second bushing or earthing stud.

Generally, all terms used in the claims are to be interpreted according to their ordinary meaning in the technical field, unless explicitly defined otherwise herein. All references to a/an/the element, apparatus, component, means, etc., are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which:

FIGS. 4a-4d show simplified cross-sectional views of a wound capacitor element in four stages during an alternating voltage duty cycle.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1A:
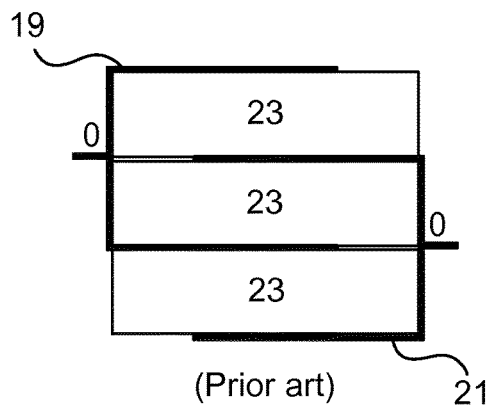
FIGS. 1a-1d schematically shows the generation of vibrations in prior art power capacitors.
Figure 1A:
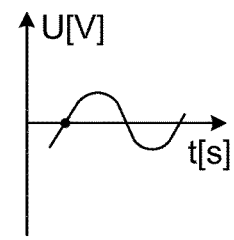
Figure 1B:
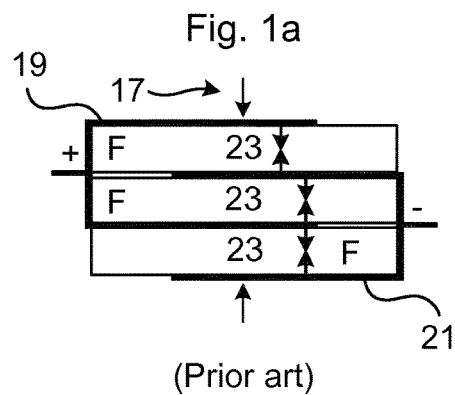
Figure 1B:
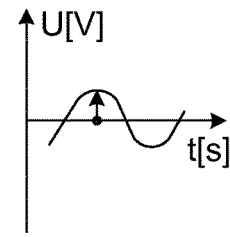
Figure 1C:
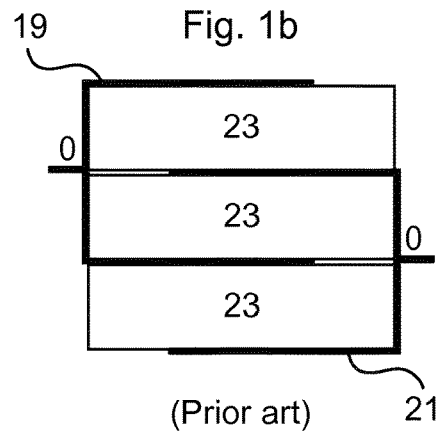
Figure 1C:
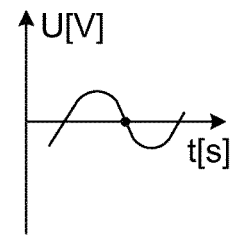
Figure 1D:
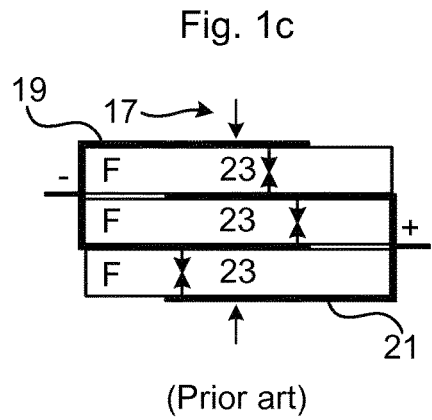
Figure 1D:
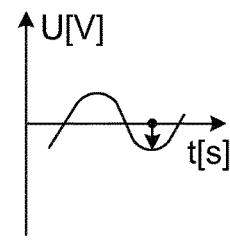
Figure 2:
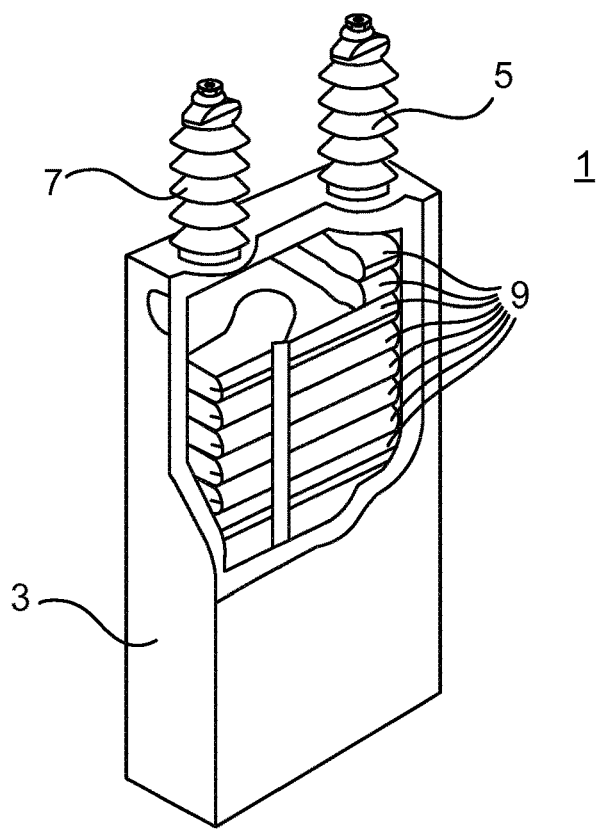
FIG. 2 shows a perspective view of an example of a power capacitor.

FIG. 2 shows an example of a power capacitor 1. The power capacitor 1 comprises a casing, tank or enclosure 3, a first bushing 5 and a second bushing 7.

As an alternative to a second bushing, the power capacitor could be provided with an earthing stud. In this case, the earthing stud generally has the same electric potential as the casing.

The first bushing 5 penetrates the casing 3. The first bushing 5 hence extends through the casing 3.

The second bushing 7 penetrates the casing 3. The second bushing 7 hence extends through the casing 3.

The power capacitor 1 furthermore comprises a plurality of wound capacitor elements 9. The wound capacitor elements 9 are arranged in a stacked manner. The wound capacitor elements 9 are arranged in direct contact with each other. Adjacent wound capacitor elements 9 are hence in direct mechanical contact.

The wound capacitor elements 9 are electrically connected to each other. They may for example be series connected and/or parallel connected. Each wound capacitor element 9 is electrically connected to the first bushing 5 and to the second bushing 7, as will be described in more detail below. As an alternative to being electrically connected to the second bushing, each wound capacitor element may instead be electrically connected to an earthing stud.

The power capacitor 1 comprises a dielectric liquid. The dielectric liquid may for example be oil or an ester. The stacked wound capacitor elements 9 are immersed in the dielectric liquid. The dielectric liquid hence penetrates the dielectric material to improve the performance thereof and fills out all voids or empty spaces inside the casing 3.

Figure 3:
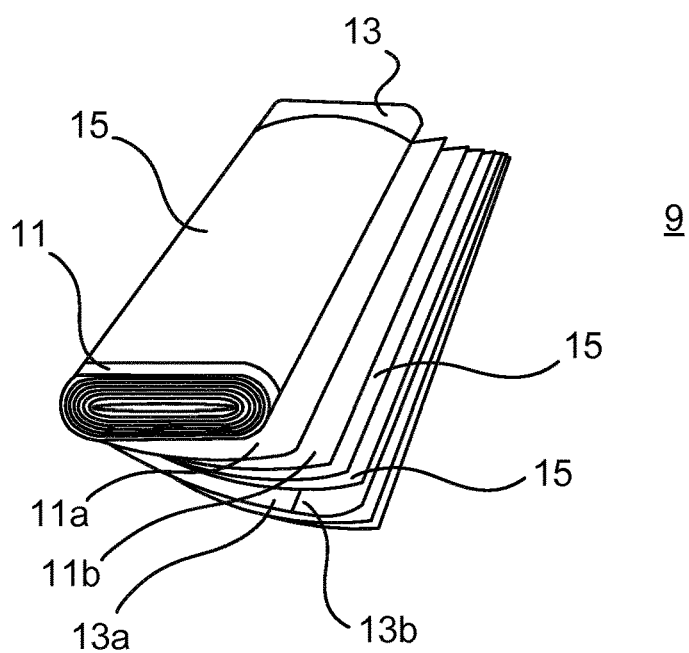
FIG. 3 shows a wound capacitor element.

With reference to FIG. 3, an example of a wound capacitor element 9 is shown. Each wound capacitor element 9 comprises a first electrode 11 and a second electrode 13.

The first electrode 11 comprises two first layers 11a and 11b of electrically conducting material. The two first layers 11a and 11b of the first electrode 11 are arranged in a layered configuration. The two first layers 11a and 11b are arranged parallel with each other for each turn of the wound capacitor element 9. The first electrode 11 may beneficially comprise exactly two first layers 11a and 11b. Alternatively, the first electrode may comprise more than two first layers of electrically conducting material.

The two first layers 11a and 11b are both electrically connected to the first bushing 5. The two first layers 11a and 11b hence have the same electric potential. The two first layers 11a and 11b are configured to be movable towards each other and away from each other in the wound state of the wound capacitor element 9. This possible movement between the two first layers 11a and 11b provides vibration attenuation, as will be described in more detail in the following.

The first electrode 11 may according to one example comprise two electrically conducting foils arranged extending parallel to each other. The two electrically conducting foils form a respective one of the two first layers 11a and 11b of electrically conducting material. The electrically conducting foils are beneficially made as thin as possible so that their total thickness is essentially the same as the thickness of a traditional foil electrode. Alternatively, the first electrode 11 may comprise a double-metallized film. In this case, each metallization surface of the double-metallized film forms a respective one of the two first layers 11a and 11b. The thickness dimension of the film is compressible and allows for movement of the two metallization surface towards each other and away from each other when the wound capacitor element is energized.

The second electrode 13 comprises two second layers 13a and 13b of electrically conducting material, as shown in for example FIG. 3. The two second layers 13a and 13b of the second electrode 13 are arranged in a layered configuration. The two second layers 13a and 13b are arranged parallel with each other for each turn of the wound capacitor element 9. The second electrode 13 may beneficially comprise exactly two second layers 13a and 13b. Alternatively, the second electrode may comprise more than two second layers of electrically conducting material.

The two second layers 13a and 13b are both electrically connected to the second bushing 7. Alternatively, the two second layers may be electrically connected to an earthing stud. The two second layers 13a and 13b hence have the same electric potential. The two second layers 13a and 13b are configured to be movable towards each other and away from each other in the wound state of the wound capacitor element 9. This possible movement between the two second layers 13a and 13b provides vibration attenuation.

The second electrode 13 may according to one example comprise two electrically conducting foils arranged extending parallel to each other. The two electrically conducting foils form a respective one of the two second layers 13a and 13b of electrically conducting material. The electrically conducting foils are beneficially made as thin as possible so that their total thickness is essentially the same as the thickness of a traditional foil electrode. Alternatively, the second electrode 13 may comprise a double-metallized film. In this case, each metallization surface of the double-metallized film forms a respective one of the two second layers 13a and 13b. The thickness dimension of the film is compressible and allows for movement of the two metallization surface towards each other and away from each other when the wound capacitor element is energized.

The wound capacitor element 9 comprises a dielectric layer 15. The dielectric layer 15 may for example comprise a polymeric material or any other suitable electrically insulating material, such as a cellulose-based material. The dielectric layer 15 is arranged between the first electrode 11 and the second electrode 13. The first electrode 11, the dielectric layer 15 and the second electrode 13 are hence arranged parallel to each other in a sandwiched configuration. The first electrode 11, the dielectric layer 15 and the second electrode 13 are together wound to form the wound power capacitor element 9. In this manner, a plurality of instances or layers of the first electrode 11, the second electrode 13 and the dielectric layer 15 is provided. The wound capacitor element 9 may be flattened, as shown in FIG. 2, to take up less space in the casing 3. As can be seen the flattened capacitor element 9 has a cross-section, i.e. a section perpendicular to the longitudinal direction of the capacitor element, which is oval or oblong. This has been achieved by making a capacitor element wound around a spindle to form a cylinder, removing the wound capacitor from the spindle and flattening or compressing the capacitor element. The majority, e.g. up to 90% of the active surfaces, i.e. those defined by the first electrode 11 and the second electrode 13 are in the same plane or parallel to it.

The power capacitor 1 will now be described in operation with reference to FIGS. 4a-4c. FIG. 4a the voltage applied to the power capacitor 1 is at a zero-crossing, and thus the potential is zero at both the first electrode 11 and the second electrode 13. In this case, there is no attractive force between the first electrode 11 and the second electrode 13.

FIG. 4b shows a situation where the first electrode 11 has a positive electric potential. This is illustrated by the arrow on the sinusoidal duty cycle of the alternating voltage. Due to Coulomb's attraction F, in for example, the uppermost layer of the dielectric layer 15, the layer 11a of the first electrode 11 is attracted to the layer 13b arranged on the opposite side of the dielectric layer 15. However, since the layer 13b at the same time is at the same electric potential as the adjacently arranged layer 13a, they will repel each other. This repelling movement between the two second layers 13a and 13b causes a compensation of the attracting movement between the layer 11a and the layer 13b. This causes a cancellation, or at least reduction, of the movement, speed and acceleration at the outermost turn.

In the situation shown in FIG. 4c, the voltage applied to the wound capacitor element 9 crosses zero again. The first electrode 11 and the second electrode 13 is thus at the same electric potential. In the absence of the attractive force between the first electrode 11 and the second electrode 13, the dielectric material 15 will relax, causing the first electrode 11 and the second electrode 13 to move away from each other. The total cross-sectional dimension of the wound capacitor element 9 will remain essentially unchanged compared to the situation shown in FIG. 4b.

In FIG. 4d the voltage applied to the power capacitor 1 is in the negative phase of the sinusoidal duty cycle. The sign of the voltage potential across the first electrode 11 and the second electrode 13 has thus shifted compared to the case illustrated in FIG. 4b but the effect will be the same as described with reference to FIG. 4b.

In this manner, the vibrations of the first electrode 11 and the second electrode 13 are partly cancelled and there will consequently be an attenuation of sound emitted by the power capacitor 1.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A power capacitor comprising:
   a casing,
   a first bushing,
   a second bushing or an earthing stud having the same electric potential as the casing,
   wherein the first bushing and the second bushing extend through the casing,
   a dielectric liquid, and
   a plurality of wound capacitor elements, each wound capacitor element including:
   a first electrode having two first layers of electrically conducting material connected to the first bushing, the two first layers being arranged movable towards and from each other,
   a second electrode having two second layers of electrically conducting material connected to the second bushing or to the earthing stud, the two second layers being arranged movable towards and from each other, and
   a dielectric layer arranged between the first electrode and the second electrode,
   wherein the two first layers, the two second layers and the dielectric layer are together wound in a plurality of turns to obtain a plurality of layers of the first electrode of the second electrodes and of the dielectric layer,
   wherein the wound capacitor elements are arranged in a stacked manner in the casing, adjacent wound capacitor elements being in direct contact with each other, wherein the capacitor elements are submerged in the dielectric liquid.

2. The power capacitor as claimed in claim 1, wherein the two first layers have the same layer thickness.

3. The power capacitor as claimed in claim 1, wherein the two second layers have the same layer thickness.

4. The power capacitor as claimed in claim 3, wherein each of the two second layers is a metallization layer provided on a respective side of a film.

5. The power capacitor as claimed in claim 1, wherein each of the two first layers is a conducting foil.

6. The power capacitor as claimed in claim 1, wherein each of the two first layers is a metallization layer provided on a respective side of a film.

7. The power capacitor as claimed in claim 1, wherein each of the two second layers is a conducting foil.

8. The power capacitor as claimed in claim 1, wherein each of the two second layers is a metallization layer provided on a respective side of a film.

9. The power capacitor as claimed in claim 1, wherein the first electrode includes exactly two first layers of electrically conducting material.

10. The power capacitor as claimed in claim 1, wherein the second electrode includes exactly two second layers of electrically conducting material.

11. The power capacitor as claimed in claim 1, wherein the capacitor elements are flattened.

12. The power capacitor as claimed in claim 1, wherein for each capacitor element each of the two first layers consists of a respective single first continuous layer and each of the two second layers consists of a respective single second continuous layer.

13. The power capacitor as claimed in claim 12, wherein each of the first two layers and each of the second two layers extend along a majority of the axial length of the capacitor element.

14. The power capacitor as claimed in claim 13, wherein each of the first two layers extends from a first axial end of the capacitor element towards an opposite second axial end of the capacitor element terminating before reaching the second axial end, and wherein each of the second two layers extends from the second axial end towards the first axial end terminating before reaching the first axial end.

15. The power capacitor as claimed in claim 1, wherein the dielectric layer is arranged between the first electrode and the second electrode, whereby the first electrode, the dielectric layer and the second electrode are arranged parallel to each other in a sandwiched configuration.

16. The power capacitor as claimed in claim 1, wherein when the first electrode has a positive or negative electric potential for each capacitor element a first layer of the first electrode is attracted to one layer of the second layers arranged on the opposite side of the dielectric layer, and another layer of the second layers of the second electrode, adjacently arranged to the one layer, and the one layer repel each other.

17. The power capacitor as claimed in claim 16, wherein when the first electrode has a positive or negative electric potential for each capacitor element the two first layers repel each other.

\* \* \* \* \*